June 15, 1937.  G. D. CALDWELL ET AL  2,083,636
PISTON LUBRICATING MEANS
Filed April 1, 1935
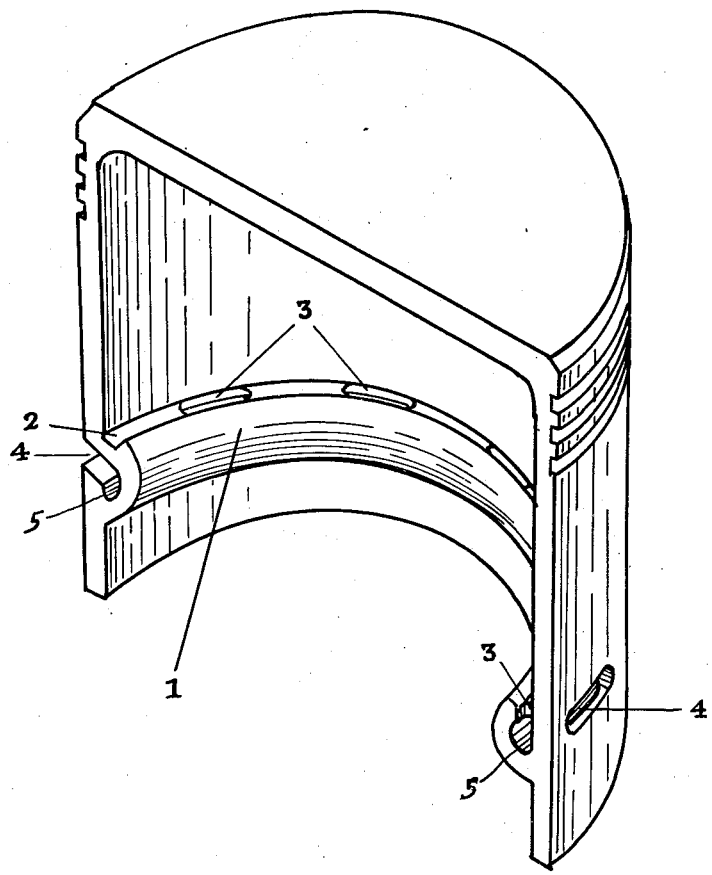
Inventors,
Geoffrey D. Caldwell,
Lonnie F. Hood
per. Carroll H. Stallings
Attorney.

Patented June 15, 1937

2,083,636

UNITED STATES PATENT OFFICE 2,083,636

PISTON LUBRICATING MEANS

Geoffrey D. Caldwell and Lonnie E. Hood, Claude, Tex.

Application April 1, 1935, Serial No. 14,111

2 Claims. (Cl. 309—8)

Our invention has to do with improvements in piston lubricating means. More particularly, it has to do with the lubrication arrangement of pistons for internal combustion engines such as gasoline powered automobiles, motorcycles, and other similar motor constructions. Especially are we interested in the engines lubricated by what is known as the splash or similar means, the arrangement being such that the lubricant is splashed up on the walls and sides of the piston and the walls of the cylinder by means of the connecting rod and other moving parts splashing the lubricant in the crankcase and splash pans.

It has long been a problem to secure proper lubrication for the walls of the cylinder and the adjacent piston walls. This is particularly true where the motor or engine has been standing for some time without running, long enough for the lubricant to drain from cylinder walls and piston walls. If the motor has become cold, and it is necessary to choke in order to start it, raw gasoline frequently surrounds the tops of the pistons and seeps down past the piston rings and into the crankcase, washing off or thinning the lubricant as it seeps down.

Pistons, because of the extremely high speeds at which they ordinarily operate (especially since practically all motor car drivers speed up their engines to several thousand revolutions per minute when attempting to warm up a cold engine) are subject to great wear and friction unless a proper film of lubrication is between the piston walls and the cylinder walls. Splash lubrication usually fails to provide the proper film of lubrication until some little time after the engine has been started.

It is a primary purpose of this invention to provide means whereby the lubricant necessary for the piston walls and cylinder walls will be trapped in the piston itself while the engine is in operation or while it is still warm after the engine has stopped, where such oil is available for use immediately upon further operation of the engine to lubricate the piston and cylinder walls.

We particularly wish to provide means whereby the piston is what may be designated "self-lubricating" regardless of whether the engine is warm and in continuous operation, or is cold and has only occasional operation.

It is an object of this invention to provide means for catching a lubricant that has been splashed on the inner walls of the piston; to provide further means for retaining at least a portion of that lubricant; and to provide still further means for forcing said lubricant out through vents or openings in the skirt or sidewalls of the piston and on to the friction surfaces between the piston and the cylinder.

A still further purpose of the invention is to provide a structure embodying the above-mentioned construction whereby said structure is an integral part of the piston itself, can be made with the same operation necessary to make the piston, and does not materially alter the means of using the piston.

It is still a further purpose to provide a construction that is simple to manufacture and comparatively inexpensive, and which may be used as a replacement part in engines heretofore placed in operation or which may hereafter be placed in operation, or which may be included as new construction feature on engines in the future, all without the necessity of altering other features of the engine than the piston.

Other objects and uses of our invention will appear from a more detailed description thereof, reference being had to the accompanying drawing.

In the drawing:

The figure illustrates a perspective view of a section through a piston embodying the features of our invention.

Referring more in detail to the figure shown, the arrangement consists of a piston, such as is in everyday use on internal combustion engines. (The parts of the piston which are of no importance for purposes of this description, and the relationship of the piston and cylinder and other parts of the engine, not being shown since they are well-known to all mechanics and others skilled in the art.)

This piston is provided with a well 1, in the form of a hollow bulge or hollow ring around the inner periphery of the piston. This well may be located near the top edge or near the bottom edge of the piston, or anywhere in between the top and bottom edge, the only limitations being that the well 1 not interfere with the connecting rod, and that the well 1 be so positioned as to catch oil or other lubricant splashed on the wall of the piston. Some control of the amount of lubricant caught and forced out between the cylinder walls and the piston walls may be had by properly designing the location of said well 1.

The well 1 is provided on its upper or top portion with a trough 2, into which the lubricant is splashed, or drips, runs, or falls from the walls of the piston.

This trough 2 collects the lubricant and conducts it to the ports 3, which lead from the trough 2 into the hollow or reservoir portion of the well.

These ports 3 are generally spaced in alternate or offset relationship to one or more openings 4, located in the outer wall or skirt of the piston. The purpose of this is to prevent any material weakening of the piston structure due to the presence of the ports and openings. Such arrangement may be varied, however, within the limits of structural strength, and the number and sizes of the ports and openings may be varied also to suit the desires of the designer.

The well has a lubricant retaining reservoir 5, which may otherwise be designated a storage trough, wherein the lubricant is caught as it runs through the ports 3. The lubricant is retained in said reservoir 5 until the movement of the piston causes it to be forced out through the openings 4.

In actual practice, the invention works as follows:

When the engine is stopped after regular operation, the lubricant which has been splashed onto the walls and other inner portions of the piston, drains down into the trough 2, where it is conducted to the ports 3. It then seeps down through the ports 3 into the reservoir 5, filling the reservoir 5 up to approximately the lower edge of the openings 4, or perhaps not quite so full or it may even have enough surface tension to bank up in said openings against the walls of the adjacent cylinder.

Thereafter, when the piston is again placed in motion, the vertical motion of the same will tend to force the lubricant out through the openings 4. Added to this is the fact that air pressure and other forces which will be put into operation by movement of the piston will have a decided effect on forcing the lubricant through said openings 4.

The same action takes place when the engine is in continuous operation, except that it is probably less important as the splash system will begin to operate after the motor is warm.

While we have herein shown and described a certain embodiment of our present invention, still we do not intend to limit ourselves thereto, except as we may do so in the claims.

We claim:

1. In a device of the class described, a piston, means on the inner circumference of said piston and respectively substantially equidistant from the bottom edge of the piston around the inner circumference of the skirt of said piston for collecting lubricant from the inner wall of said piston and retaining the lubricant, and means adjacent said retaining means for dispensing said lubricant upon movement of the piston outwardly through openings in the outer wall or skirt of the piston.

2. In a device of the class described, means in connection with the inner surface of the skirt of the piston for catching a splashed lubricant, reservoir means for retention of said lubricant, and conduction means for dispensing said lubricant trapped from the inner surface of the skirt of the piston to the outer friction surface of said device, said catching, retaining and dispensing means being respectively substantially equidistant from the bottom edge of the piston.

GEOFFREY D. CALDWELL.
LONNIE E. HOOD.